Figure 1:
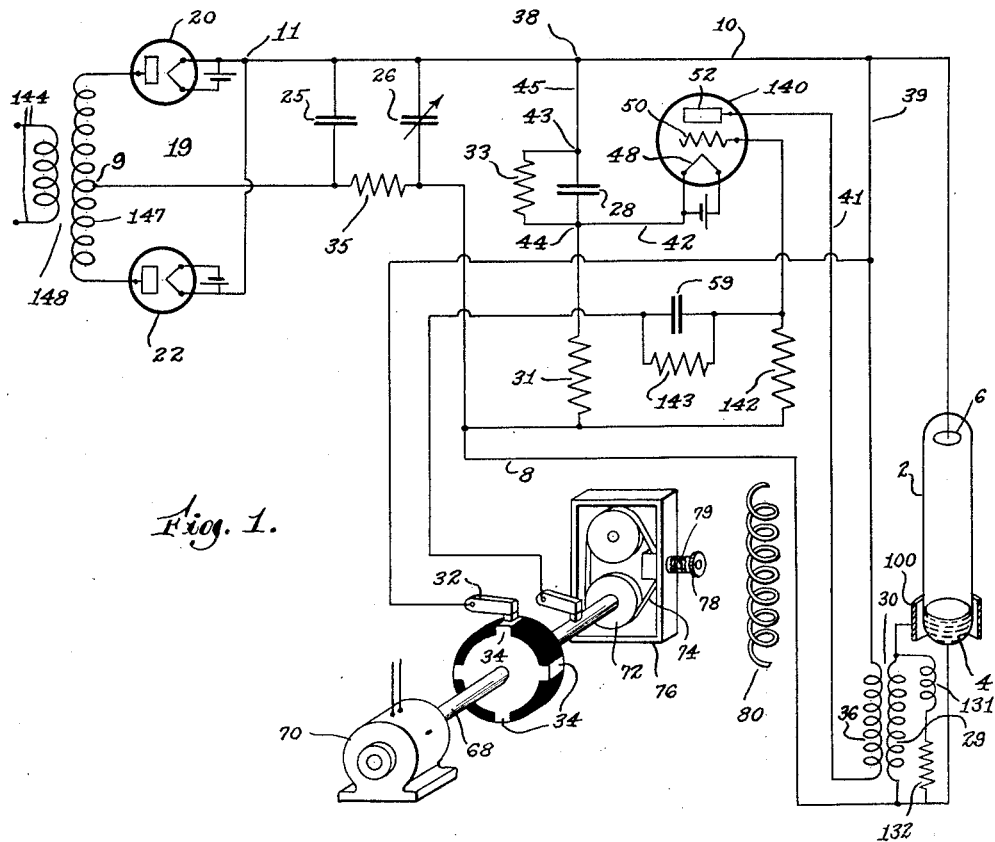

Jan. 9, 1940.   H. E. EDGERTON   2,186,013
MOTION-PICTURE APPARATUS

Original Filed March 10, 1934   2 Sheets-Sheet 1

Inventor
Harold E. Edgerton
by David Rines
Attorney

Jan. 9, 1940.  H. E. EDGERTON  2,186,013
MOTION-PICTURE APPARATUS
Original Filed March 10, 1934    2 Sheets-Sheet 2

Inventor
Harold E. Edgerton
by David Rines
Attorney

Patented Jan. 9, 1940

2,186,013

UNITED STATES PATENT OFFICE 2,186,013

MOTION-PICTURE APPARATUS

Harold Eugene Edgerton, Watertown, Mass.

Application March 10, 1934, Serial No. 714,978
Renewed April 4, 1939

39 Claims. (Cl. 88—18)

The present invention relates to high speed motion-picture apparatus. This application is a continuation in part of application Serial No. 610,045, filed May 9, 1932.

In the common type of motion-picture apparatus, such as that now used for taking and projecting commercial motion pictures, the film is moved intermittently and, while at rest, is subjected, for a brief interval, to light from a constant light source, through the action of a shutter. In the case of the motion-picture camera, the amount of illumination of the film, or the amount of exposure necessary for obtaining a satisfactory picture, is determined by the speed of the lens, the sensitivity of the film, and the intensity of the source of light. When photographing rapidly moving objects, the time of exposure must be short, in order that the object may not move substantially during the exposure. The intensity of the source of illumination must consequently be high and the shutter must work rapidly. The light is used for only a small fraction of the total time; so that, if a continuous source of illumination is employed, the light is not used to best advantage and, in the case of artificial light, the power cost is increased. At high speeds of operation, furthermore, difficulty is experienced in the design and operation of the shutter and the mechanism for moving the film. In the case of the projector, the time of exposure may be relatively long, but the intensity of the light used is limited by the inflammability of the film; and the intermittent movement of the film, made necessary by the requirement that the film be stationary while the light is being projected through the film, imposes stresses on the film, which often results in breakage.

I purpose to eliminate the disadvantages of the motion-picture apparatus described above by using an intermittent source of light of very high intensity, in which the separate flashes of light last only for the time during which exposure of the film is desired. By this arrangement, the exposure may be made very short, with the result that the film may be moved continuously. Neither the speed at which the film is moved nor the movement of the object to be photographed affects the clearness of the picture. In the case of projection, since the light lasts only for a very short time, there is no danger of igniting the film; and the film may be moved continuously without causing the projected image to be blurred. Perfect definition is obtained, both in taking and projecting the pictures. When the intensity of the intermittent light source is much greater than the intensity of the surrounding light, the shutter may be eliminated; since the relative effect produced by the surrounding light is of such an order of magnitude as to be indistinguishable relative to the effect produced by the intermittent-light source.

An object of my invention is to provide motion-picture apparatus in which successive portions of the film are subjected to separate flashes of light caused by surges of current flowing through a condenser and a luminescent-discharge device.

Another object of my invention is to provide motion-picture apparatus in which the source of light is obtained from successive surges of current flowing through a circuit including a luminescent discharge device adapted for high-speed operation.

Another object of my invention is to provide motion-picture apparatus in which the source of light is obtained from successive discharges of a condenser through an oscillatory circuit including a rectifier tube.

Another object of my invention is to provide motion-picture apparatus in which the source of light is obtained from successive discharges of a condenser through a luminescent discharge device or devices and in which the condenser is disconnected from the charging source prior to discharge.

Further objects of my invention will become apparent as the description proceeds and the features of novelty which characterize my invention will be pointed out in the claims annexed to and forming a part of this specification.

Figure 2:
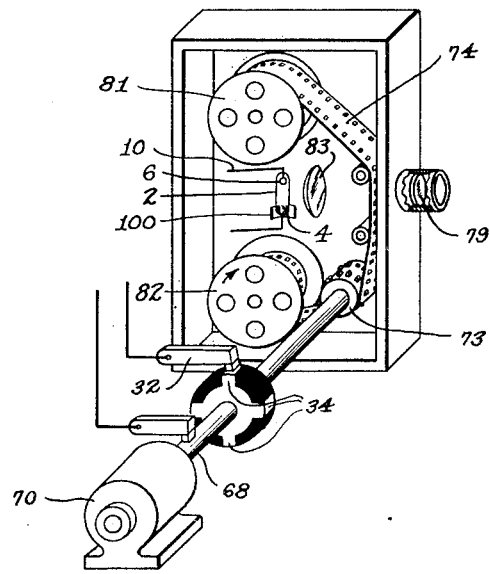
Figure 3:
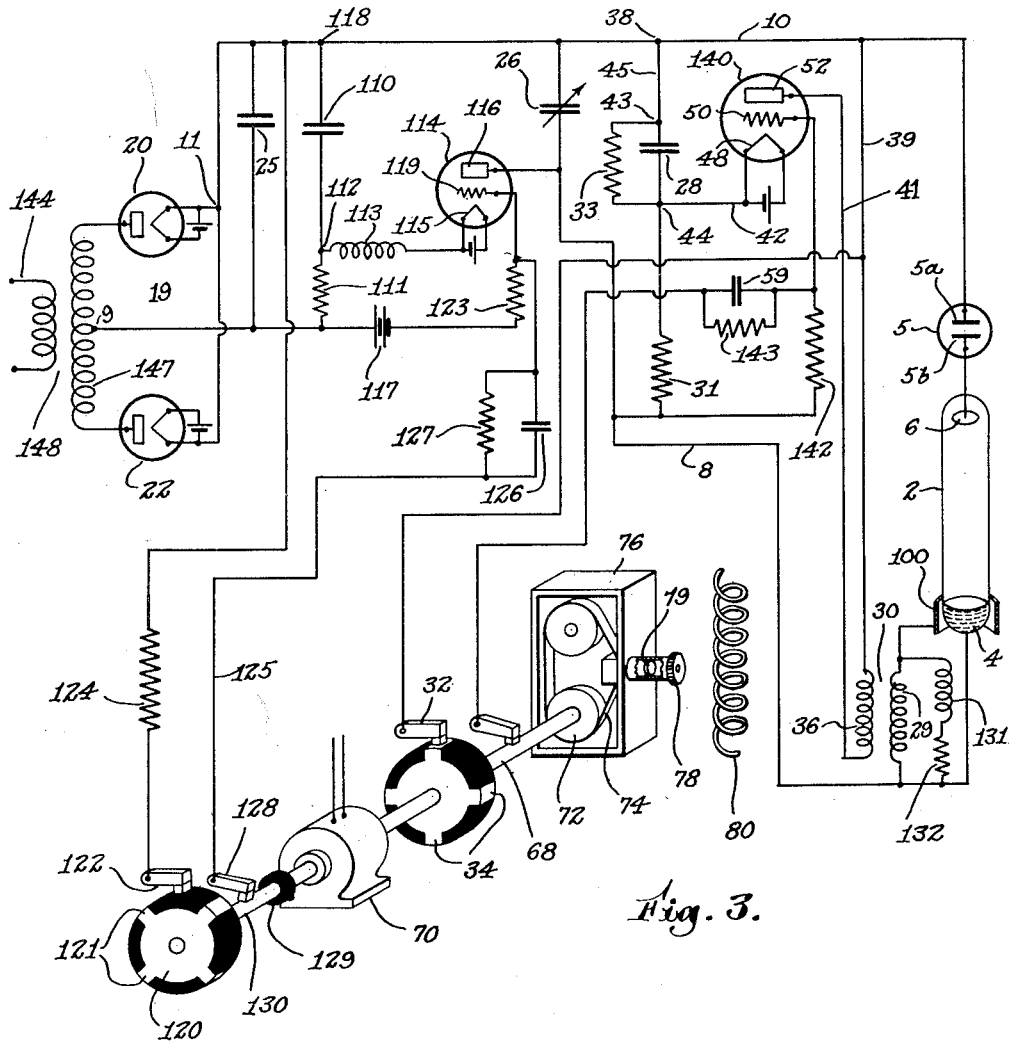
Figure 4:
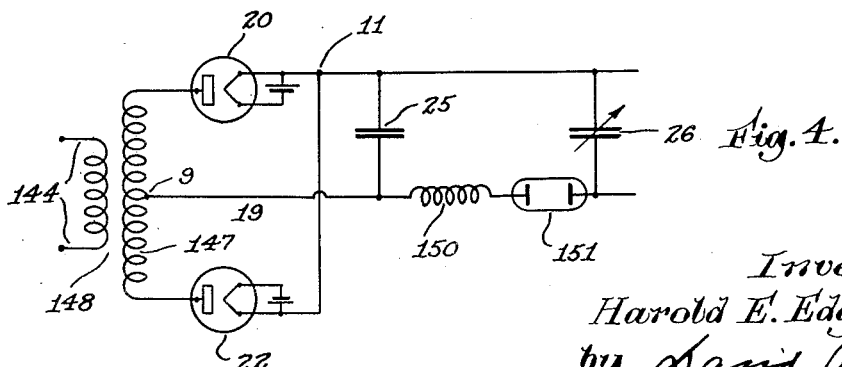

The invention will now be described in connection with the accompanying drawings, in which Fig. 1 is a diagrammatic view of a motion-picture camera embodying my invention; Fig. 2 is a view of the motion-picture apparatus shown in Fig. 1 adapted for use as a motion-picture projector; Fig. 3 is a diagrammatic view of a motion-picture camera embodying a modification of my invention; and Fig. 4 is a fragmentary view of another modification of my invention.

In the form of my invention illustrated in Fig. 1, the light to expose the film is obtained from a luminescent gaseous electric discharge device such as a mercury tube 2 provided with a mercury-pool cathode 4 and an anode 6. The tube 2 is of the type described in the said application, and may be of the long, slender form illustrated or it may have any other shape, such as zig-zag or helical. It may be provided with a restricted neck (not shown) at its lower end to permit tilting the tube to a horizontal position, though this is not essential.

An external, condenser electrode or control grid 100, arranged outside of the mercury vapor tube 2, around the mercury pool 4, controls the starting instant of the current flow through the tube. The external, condenser electrode 100 may be of any form, such as a wire-mesh screen, a wire wound around the tube 2, or a metal foil attached to the surface of the glass. For clearness, however, the electrode 100 is shown in the drawings as slightly separated from the tube 2. The external, condenser electrode 100 is placed where the operation of the tube 2 is most satisfactory. Under usual conditions, the external electrode 100 is most effective when attached to the outside of tube, opposite the meniscus of the mercury. It is likewise possible to employ an internal electrode or control grid, suitably placed with respect to the cathode 4. Although the operation of the tube is satisfactory when the vacuum is as close to perfect as it is possible to get it by present-day, evacuation methods, the operation is likewise satisfactory when a small amount of gas, such as neon, helium, argon, air, etc., is put into the tube. These other gases cause modifications in the color of the light, because the characteristic spectral colors of the gas are radiated when a surge of current passes through the tube. Other substances, such as sodium, aluminum, barium, iron, etc., or various combinations of these, might also be employed as the cathode at the bottom of the tube.

The cathode 4 and the anode 6 are shown respectively connected by conductors 8 and 10 to a main, discharge condenser 26 which, when charged, provides the source of energy from which surges of current may flow through the tube 2 to produce brief flashes of light. Both the tube 2 and the main, discharge condenser 26 are connected, by the conductors 8 and 10, through an impedance 35 (Fig. 1) to any desired source of direct current, such as a full-wave rectifier 19 (Fig. 1) or a charged condenser 110 (Fig. 3). The condenser 25 may be part of the source of direct current. The impedance 35 is usually a combination of resistance and inductance. The rectifier 19 is conventional, being shown as comprising thermionic or gaseous-discharge, rectifier tubes 20 and 22, connected to a source 144 of alternating current by a transformer 148. The negative terminal 9 of the source of direct current is at the midpoint of the secondary winding 147 of the transformer; and the positive terminal 11 of the source of direct current is connected to the cathodes of the rectifier tubes 20 and 22. The conductor 10 is thus connected to the positive side of the source of direct current.

Energy to charge the condenser 26 flows, from the source of direct current, through the impedance 35. The impedance 35 is shown connected to the negative terminal 9 although it is obvious that the impedance may be connected to the positive terminal 11. With this circuit, the condenser 26 is continuously charged through the impedance 35 and is ready, at all times, to deliver a surge of current to the tube 2. The capacity of the condenser 26 may be adjusted to vary the energy available for discharge through the tube 2.

The voltage to which the condenser 26 is charged must be insufficient to cause the tube 2 to break down and become conductive without the starting pulse of potential. In order to cause the tube 2 to become conductive, at the desired intervals, I prefer to connect the cathode 4 and the external electrode or control grid 100 of the tube 2 to the discharge circuit of the condenser 26 by means of an auxiliary or trip circuit. The connections are shown effected through a step-up transformer 30 and as comprising a condenser 28 that is caused to discharge suddenly through the primary winding 36 of the transformer 30, to produce a sudden, high voltage at the electrode 100, thereby initiating the discharge of the condenser 26 through the tube.

The condenser 28, which provides the initiating impulse in the auxiliary circuit, is charged, through a resistance 31, from any suitable source of direct current, which may be the source of direct current supply for the condenser 26. The resistance 31 is continuously connected to the full-wave rectifier 19. The condenser 28 is connected in series with a grid-controlled, gaseous rectifier device, such as a thyratron 140, and the primary 36 of the transformer 30. The connections include a conductor 42, leading from the terminal 44 of condenser 28, to the cathode 48 of the electron-discharge device 140; a conductor 41, leading from the anode 52 of the electron-discharge device 140 to the primary winding 36; and the conductors 39, 10 and 45 leading from the primary winding 36 to the other terminal 43 of the condenser 28. The current flowing through the resistance 33 causes a voltage drop through the resistance 31, which is negative with respect to the cathode 48; and, since the grid 50 is connected to the negative end of the resistance 31, through a resistance 142, the grid 50 is normally negative with respect to the cathode 48. The tube 140 is, therefore, normally non-conductive, preventing discharge of the condenser 28 through the tube 140.

To render the discharge device 140 conductive, a switch, having a stationary brush or contact member 32 and movable contact members 34, is closed to connect the grid 50 to the positive side of the source of direct current, at the conductor 10, and by way of the conductor 39. A small trip condenser 59 is arranged in the circuit between the conductor 10 and the grid 50 and is quickly charged after the contact members 32 and 34 are closed. After the condenser 59 is charged, the grid 50 again becomes negative with respect to the cathode 48, and remains negative regardless of the time that the contact members 32 and 34 remain closed. Only a single impulse is obtained at each closing of the contact members 32 and 34. After the contact members 32 and 34 are closed, the energy in the condenser 28 is suddenly discharged through the primary 36 of the step-up transformer 30, thereby magnetically inducing a high potential quickly upon the external electrode 100. The effect of this quickly applied, high voltage is to produce a source of electrons upon the mercury cathode 4, rendering the tube 2 conductive. The main discharge condenser 26 now suddenly discharges its energy through the tube 2 and part of this energy is transformed into useful light. The amount of energy discharged through the tube 2 by the circuit is so considerable that the flash of light produced by the resulting arc is very intense and lasts less than ten microseconds. This time duration is short enough to obtain sharp, clear photographs of moving objects and for taking a series of photographs upon a continuously moving film without blur. The duration of the flash depends upon a number of factors, among which are the capacity of the condenser 26 and the energy stored therein, the impedance of the leads 8 and 10, and the dimensions and operating temperature of the tube 2. Not only is the light of high intensity, but it is easily and accurately controlled by the tube 140 which acts also to amplify small, electrical impulses for starting the light flashes at the desired instant.

The arc through the tube 2 is not maintained by current flowing from the source of direct current, because of the action of the impedance 35, which limits the current flow to such an extent that the tube is deionized and the arc is extinguished. The inductance of the impedance 35 is helpful, since it prevents a sudden change of current flowing through it and thereby tends to delay the flow of current from the source of direct current through the tube 2 until the tube 2 has deionized. The inductance of the conductors 8 and 10 is also helpful in extinguishing the arc through the tube 2. The inductance of these conductors is preferably proportioned so that the circuit through the conductors 8 and 10, the condenser 26, and the tube 2 is oscillatory. Since the tube 2 has rectifier characteristics, it will not conduct current in the reverse direction. When the current flowing through the tube 2 becomes zero at the end of the first half cycle of the discharge from the condenser 26, the current flow ceases. At this instant, the condenser 26 is charged in the direction opposite to the normal direction and is, therefore, not able to send current through the tube 2, or otherwise to discharge, regardless of the condition of ionization of the tube 2 or the voltages which may be impressed on the grid 100. Due to the impedance 35, and particularly to the inductance of this impedance, charging current from the source of direct current, which would tend to build up a normal charge on the condenser 26, is delayed.

This delay gives the tube 2 still further time to de-ionize and further assists in obtaining a sharp and well defined flash of light from the tube 2. By having the discharge circuit for the condenser 26 oscillatory, it is possible to obtain a shorter flash of light from the tube, since the duration of the discharge current from the condenser 26 is determined by the oscillation frequency of the current, and not by the energy in the condenser, as would be the case with a non-oscillatory discharge.

Immediately after the condenser 28 discharges, a charging current flows from the source of direct current, through the condenser 28 and the resistance 31. This current causes a voltage drop across the resistance 31, which is negative with respect to the cathode 48 and is nearly equal to the voltage of the direct-current supply at the first instant, but becomes smaller as the condenser 28 becomes charged. The grid 50 is thus caused to be very negative with respect to the cathode 48 and, in this manner, the electron-discharge device 140 is prevented from starting when the anode 52 becomes positive with respect to the cathode 48, as the charge on the condenser 28 builds up.

The illustrated camera 76 can be used for taking pictures of rapidly moving objects at very high speeds. A motor 70 drives a drum 72 which continuously advances a band of film 74 within the camera 76 behind a lens 79 provided with a member 78 that operates automatically to prevent double exposure of the film. The motor also rotates a commutator of which the contact members 34 are segments and on which bears the before-mentioned stationary brush or contact member 32. The contact members 32 and 34 control the timing of the light flashes; as explained above, each time that the contact members 32 and 34 close, a single flash of light is obtained from the tube 2. The commutator is usually driven so that a separate flash is obtained each time that the film advances one frame distance, in order that the pictures shall be properly framed for subsequent projection. The duration of the flash of light from the tube 2 is so short (ten microseconds or less) that no appreciable blurring of the image on the film occurs, even at high, film speeds. The intensity of the light is such that adequate exposures are obtained with one flash of light from the tube 2. Due to the simplification of the camera, because of the elimination of the intermittent motion of the film, the number of pictures per second may be very great, 1000 or more. This type of photography is very useful in the study of certain, high-speed phenomena, such as a rapidly moving, valve spring 80.

One characteristic of the present invention is that the light produced by the tube 2 may be of much higher, instantaneous intensity than is attainable with mercury tubes the light of which is continuous, instead of periodic. If the tube were subjected continuously to current flow, such as that obtained from the condenser 26, it would become destroyed. It is found that the light thus periodically emitted by the high-current discharges of the tube, at these high potentials, besides being of higher intensity, has a much larger proportion of components from the green, yellow and the red portions of the visible spectrum than is the case with the ordinary current discharges, produced with mercury tubes as normally operated. This light, in fact, is such as to compare very favorably with natural, white light. The ultra-violet portion of the spectrum is found to have many additional components and those of the so-called near, ultra-violet portion of the spectrum are very actinic, and hence suitable for photographic work.

In Fig. 2, there is shown an arrangement for using the apparatus shown in Figs. 1 and 3 to project motion pictures. The motor 70 drives a sprocket wheel 73 which pulls the film, from a reel 81, past the lens 79, to a reel 82, which is driven by any suitable means (not shown) so as to wind the film thereon. The tube 2 is placed behind the film and a condensing lens 83 directs the light through the continuously moving film 74 and the lens 79. The contact members 34 of the commutator are driven by the motor 70 past the stationary contact member 32 to control the flashing of the tube 2, so that the flash occurs when each picture is correctly framed over the lens 79. Since the flash of light is so short, there is no blurring of the projected image, even though the film is actually moving continuously. The duration of the flash of light may be so short that the film does not move an appreciable distance while the light is on,—say, a distance equal to one-thousandth of a frame. The projected image makes an impression on the eye which lasts until the next flash of light, which occurs when the next-succeeding portion of the film is correctly framed over the lens 79.

The electrical control circuits illustrated and described herein make it possible to control accurately the exact instant of the light flash by means of a very small amount of power. If the contact brush 32 and commutator contact member 34 are small and are very accurately constructed, as shown diagrammatically, the circuit will be tripped at exactly the right instant correctly to "frame" the picture on the moving film. The importance of accurate flashing of the intermittent light source will be realized when the magnification of the picture on the screen during projection is calculated. The brushes and the commutator would become pitted in case any appreciable current were required to flow in them resulting eventually in inaccurate timing of the flashes of light. In the circuits illustrated and described herein, the current requirements are very small and consist of brief pulses occurring at the instant of contact.

Among the advantages that this new type of projector has over the ordinary projector are, first, the absence of the noise from the intermittent motion; secondly, the decreased wear on the film; and thirdly, the simplicity of construction.

In Fig. 3, I have shown a modification of the camera illustrated in Fig. 1, adapted to very high speeds. The circuit connections are the same as those shown in Fig. 1, except for modifications to be described and as shown. As the energy per flash through the tube 2 increases, or as the rate of flashing increases, the tube 2 increases in temperature. This increase in temperature is accompanied by a relatively greater intensity of light, by a slower deionization time of the tube after each flash, and by the requirement of a higher operating voltage. The slower deionization time of the tube limits the recharging time of the condenser and thus lengthens the necessary interval between flashes. This is one of the limits to the speed at which the camera may be operated.

To overcome the difficulty of slow deionization and, at the same time, to benefit from the increased intensity of light obtained from a hot tube or other discharge device having a slow deionization time, I connect in series with the tube 2 a tube 5, and proportion the tube 2 so that it shall remain cool and have a rapid deionization time at the required operating speed, and control the flow of current through the hot tube 2 by means of the cool tube 5. The tube 5 has electrodes 5a and 5b, but needs no control electrode, since the current through it is controlled by the tube 2. The tube 5 may be any gaseous, electric-discharge device, such as electrodes spaced in air, or within an envelope. If the electrodes are within an envelope, one of the electrodes may be of mercury, or both may be of metal. The medium confined within the envelope may be a gas or vapor and I find that the gas or vapor pressure within the envelope may be substantial, even of the order of magnitude of atmospheric pressure, without affecting very satisfactory operation of the device. The deionization time of a discharge device such as shown at 5 is relatively slow; but, since it is in series with the tube 2, which deionizes very rapidly, the deionization time of the device 5 is not important, as the deionization of the tube 2 interrupts the current.

With this arrangement, I prefer to have the circuit including the condenser 26, lead 10, gaseous discharge device 5, mercury tube 2 and lead 8 oscillatory. As the tube 2 will not conduct a reverse current, the current flow through the tube ceases when the oscillatory discharge current from the condenser 26 becomes zero. At this time, as the condenser 26 is charged in the reverse direction, it can not discharge through the tube 2 and the discharge device 5 until charged in the normal direction, because of the rectifier action of the tube 2. When the discharge is oscillatory, the duration of the surge of current through the discharge devices is equal to the duration of the first half-cycle of the discharge. This period is independent of the energy stored in the condenser and depends only on the constants of the circuit. It is much shorter than the interval of time between successive flashes.

In order to allow still further time for deionization, I provide an arrangement for charging the condenser 26 in which the condenser is charged just before the desired time of the flash, and is then disconnected from the charging source before the time of the flash. With this arrangement, there is no chance for current to flow through the discharge devices until the charging source of voltage is again connected to the condenser 26 to charge the condenser. For instance, if pictures are to be taken at the rate of 5,000 per second, or one picture every 200 microseconds, and the duration of the flash is 1 microsecond, it is possible to allow 100 microseconds or more for deionization of the tube 2, and the discharge device 5 need never be completely deionized. The only requirement is that the series circuit, which includes the tube 2 and the discharge device 5, must be able to stand, without breakdown, the voltage across the condenser 26 when the condenser 26 is again being charged.

In the arrangement shown, the charged condenser 110 furnishes the source of direct current for charging the condenser 26. The condenser 110 is continuously charged, through a resistance 111, from any source of direct current, such as the before-described, full-wave rectifier 19. The condenser 110 is connected to the condenser 26 by a circuit which includes an inductance 113, connected to a terminal 112 of the condenser 110, the cathode 115 of an electron-discharge device, such as a thyratron tube 114, the anode 116 of the electron-discharge device 114, the condenser 26, and the conductor 10 leading from the condenser 26 to the other terminal 118 of the condenser 110. The grid 119 of the tube 114 is connected to the negative end of the resistor 111 through a resistance 123 and is, therefore, given a negative bias with respect to the cathode 115 when current flows through the resistor. A battery 117 may be used to increase the negative bias of the grid 119. The tube 114 is, therefore, normally non-conductive and the condenser 110 is, therefore, normally disconnected from the condenser 26. In order to render the tube 114 conductive, the grid 119 is connected to the positive side of the source of direct current by a circuit which includes a resistance 124, contact members 121 and 122, a conducting shaft 130, a contact member 128, a conductor 125, and a trip condenser 126. At the first instant of closing of the contact members 121 and 122, the condenser 126 has no charge and the resistances 124 and 123 act as a voltage divider, so that the grid 119 is at a positive potential sufficient to cause the tube 114 to become conductive. The potential of the grid 119 becomes less negative with respect to the cathode and, therefore, causes the tube 114 to become non-conductive as soon as the plate current becomes zero. The time that the tube 114 remains conductive is not dependent upon the time that the contact members 121 and 122 remain closed. The condenser 126 discharges through a shunt resistance 127 when the contact members 121 and 122 are open.

When the contact members 121 and 122 are closed and the tube 114 becomes conductive, the condenser 110, which is kept continuously charged, is connected to the condenser 26. Since the condenser 26 is connected to the discharge device 5 and the tube 2, the condenser 110 is also connected to the discharge device 5 and the tube 2. In order to retard the voltage rise across the condenser 26, the discharge device 5, and the tube 2, the impedance 113, comprising combination of inductance and resistance, is connected in series with the condenser 110 and the condenser 26. The inductance of the impedance 113 prevents a sudden initial rush of current through the tube 114, or through any switch which may be used in place of the tube 114. The inductance and capacity mentioned above form an oscillatory circuit which is needed in order to bring the plate current of the thyratron to zero, so that the grid may gain control. In an oscillatory circuit of this type, the condenser 26 is charged to a higher potential than the supply of direct current at the time when the current becomes zero. The efficiency of charging the condenser is also increased. As energy is transferred from the condenser 110 to the condenser 26, the potential of the cathode 115 becomes more positive relative to the terminal 9 of the source of direct current. The grid 119, therefore, becomes more negative with respect to the cathode 115, and the deionization of the tube 114 is assisted. When the tube 114 is deionized, the condenser 26 is effectively disconnected from the condenser 110.

The movable contact members 121 are preferably the segments of a commutator 120, which is mounted on a shaft 130, driven by the motor 70. The contact members 121 are all connected to the shaft 130, and a brush 128, which bears on the shaft 130, completes the circuit from the contact members 121 to the conductor 125. An insulating member 129 insulates the shaft 130 from the rest of the motor 70. The commutator 120 is placed so that the contact members 121 and 122 shall have become closed and opened before the contact members 32 and 34 close, to cause the condenser 26 to discharge through the circuit including the tube 2 and the discharge device 5, in the manner described in connection with Fig. 1.

Even after current flow has ceased in the primary winding 36, however, an oscillatory current may continue to flow in the secondary winding 29, and thus produce voltages on the electrode 100 sufficient to cause the tube 2 to become conductive, or to delay the deionization of the tube 2. In order to prevent this oscillatory current in the winding 29, I have connected a resistance 132 and an inductance 131 across the secondary winding 29, of values such that the surge of current through the winding 29 is damped. Other arrangements for providing a damped, secondary winding may also be used, such as varying the constants of the winding 29 itself. By the use of the damped transformer for impressing the starting voltage on the grid 100, it is possible to use a surge from a low-voltage source, such as the condenser 28, in the primary winding 36 and to obtain a single, corresponding surge in the secondary winding 29 of sufficient voltage to cause the tube 2 to become conductive.

In the operation of the camera shown in Fig. 3, just prior to the closing of the contact members 32 and 34, the condenser 26 is charged and is disconnected from the rectifier 19, the condenser 28 is charged, the tubes 140 and 2 are non-conductive, and the film 74 is not accurately framed behind the lens 79.

As soon as film 74 is accurately framed behind the lens 79, the contact members 32 and 34 are closed, connecting the grid 50 to the positive conductor 10 and rendering the tube 140 conductive. The energy in the condenser 28 immediately discharges, causing a surge of current to flow through the primary winding 36 and a corresponding surge to be magnetically induced in the secondary winding 29. The surge of current in the secondary winding 29 causes the tube 2 to become conductive, and the condenser 26 discharges through the oscillatory circuit including the tube 2 and the discharge device 5, producing a flash of light. At the end of the first half-cycle of the oscillation, current flow from the condenser 26 ceases and since, at this instant, the condenser 26 is charged in the reverse direction, no further current flow is possible. As the secondary winding 29 is damped, only a single surge appears in the winding 29 at each closing of contact members 32 and 34.

As explained in connection with Fig. 1, as soon as the condenser 28 discharges, the cathode 48 becomes more positive and, since the condenser 59 has, by this time, become charged, the grid 50 returns to its negative potential. The negative bias of the grid 50 is sufficient to cause the tube 140 to become non-conductive, and further surges from the condenser 28 are not possible until the contact members 32 and 34 are again closed.

The condenser 26 remains disconnected from its charging source and the condenser 110 until after the tube 2 has become deionized. At some time after the tube 2 has become deionized, the contact members 121 and 122 become closed, causing the tube 114 to become conductive and, thereby, causing the condenser 26 to become charged from the condenser 110. After the condenser 26 is charged, the tube 114 becomes non-conductive and the condenser 26 becomes effectively isolated from the charging source. The condenser 28 has been charged through the resistance 31 which, as before stated, is continuously connected to the full-wave rectifier 19. The system is therefore now ready to deliver another surge of current to the tube 2 and the discharge device 5. This surge will not occur until the contact members 121 and 122 have become opened and the contact members 32 and 34 have again become closed.

In connection with the description of Figs. 1 and 3, I have discussed the beneficial effects of an inductance placed between the charging source and the condenser 26. In Fig. 4, there is shown a fragmentary view of a portion of a modification which is identical with the circuit of Fig. 1 to the right of the condenser 26. In this arrangement, the condenser 26 is connected to the charging source, such as the rectifier 19, through an inductance 150 in series with an impedance which decreases with increasing current, such as a gaseous-discharge device 151, the latter being preferably arranged between condenser 26 and the inductance 150. As long as the condenser 26 is charged, no voltage exists across the inductance 150 and the discharge device 151. As soon as the condenser 26 discharges, a voltage is impressed across the inductance 150 and the discharge device 151. The inductance 150 resists the flow of current and initially sustains the greater part of this voltage. At low voltages, the impedance of the discharge device 151 is high. Since the condenser 26 is connected to the tube 2, or the tubes 2 and 5, the tubes have only to withstand the voltage across the condenser 26 and do not have to withstand the full charging voltage. As the flux builds up in the inductance 150, the voltage drop across the discharge device 151 increases, the impedance of the discharge device 151 decreases, and the current flow increases. This arrangement has a tendency to retard the charging of the condenser 26, at first, and to charge the condenser 26 with increasing rapidity as time goes on. By this arrangement, it is possible to retard the voltage rise of the condenser 26, and thereby to allow the tube 2 further time for deionization.

Except for the arrangement for charging the condenser 26, the operation of the apparatus shown in Fig. 4 is identical with that shown in Fig. 1.

In the accompanying claims, the word "predetermined" is to be understood as referring to any standard, whether variable or fixed.

Further modifications will occur to persons skilled in the art, and all such are considered to fall within the spirit and scope of the invention, as defined in the appended claims.

What is claimed is:

1. Motion-picture apparatus comprising a luminescent-discharge device, a circuit including means for storing electric energy and said luminescent-discharge device, and means for subjecting successive portions of a film to flashes of light from the luminescent-discharge device, said means having means including a grid-controlled electron-discharge device for causing a surge of current to flow in said circuit at successive intervals.

2. Motion-picture apparatus comprising a luminescent-discharge device, a circuit including means for storing electric energy and said luminescent-discharge device, and means for subjecting successive portions of a film to flashes of light from the luminescent-discharge device, said means having means including a grid-controlled electron-discharge device in said circuit for causing a surge of current to flow in said circuit at successive intervals.

3. Motion-picture apparatus comprising a discharge device having relatively quick deionization time, a discharge device having relatively slow deionization time, a condenser, a circuit including said condenser and said discharge devices, and means for subjecting successive portions of a film to flashes of light from the luminescent-discharge device, said means including a grid-controlled electric-discharge device for causing a surge of current to flow through said condenser and said discharge devices at successive intervals.

4. Motion-picture apparatus comprising a discharge device having relatively quick deionization time, a discharge device having relatively slow deionization time, and means for subjecting successive portions of a film to flashes of light from the luminescent-discharge device, said means including a grid-controlled electric-discharge device for causing a surge of current to flow through said discharge devices at successive intervals.

5. Motion-picture apparatus comprising a luminescent-discharge device, a rectifier tube, an oscillatory series circuit connecting said discharge device and said rectifier tube, and means subjecting successive portions of a film to flashes of light from the luminescent-discharge device, said means including means for causing a surge of current to flow in said circuit at successive intervals.

6. Motion-picture apparatus comprising a luminescent-discharge device, a condenser, a rectifier tube, an oscillatory, discharge circuit including said condenser, said luminescent-discharge device and said rectifier tube, an impedance, means for charging said condenser through the impedance, and means for subjecting successive portions of a film to a separate flash of light, said means including means for causing said condenser to discharge through said rectifier tube at successive intervals.

7. Motion-picture apparatus comprising a condenser, a mercury-pool tube having a control grid, a discharge circuit connecting said condenser and said tube, means for charging said condenser, a transformer having a primary winding and a damped secondary winding connected to said grid, and means for subjecting successive portions of a film to a separate flash of light, said means including means for causing a surge of current to flow through the primary winding at successive intervals.

8. Motion-picture apparatus comprising a condenser, a mercury-pool tube having a control grid, a circuit including said condenser and said tube, and means for subjecting successive portions of a film to a separate flash of light, said means including an auxiliary circuit connected to said control grid for causing a surge of current to flow through said condenser and said tube at successive intervals.

9. Motion-picture apparatus comprising a mercury-pool tube having a control grid, a circuit including said tube, and means for subjecting successive portions of a film to a separate flash of light, said means including an auxiliary circuit connected to said control grid for causing a surge of current to flow through said tube at successive intervals.

10. Motion-picture apparatus comprising a condenser, a gaseous, electric-discharge device having a control grid, a discharge circuit connecting said condenser and said device, means for charging said condenser, a transformer having a primary winding and a damped secondary winding connected to said grid, and means for subjecting successive portions of a film to a separate flash of light, said means including means for causing a surge of current to flow through the primary winding at successive intervals.

11. Motion-picture apparatus comprising a condenser, a gaseous, electric-discharge device having a control grid, a source of energy, a series circuit including said condenser, said source of energy and said gaseous, discharge device, and means for subjecting successive portions of a film to a separate flash of light, said means including means connected to said control grid for causing a surge of current to flow simultaneously from said source of energy through said condenser and said device.

12. Motion-picture apparatus comprising a condenser, a gaseous, electric-discharge device having a control grid, a source of energy, a series circuit including said condenser, said source of energy, and said gaseous, discharge device, an auxiliary circuit connected to said control grid having a condenser, and means for subjecting successive portions of a film to a separate flash of light, said means including means for causing a surge of current to flow in said auxiliary circuit to said control grid.

13. Motion-picture apparatus comprising a condenser, a gaseous, electric-discharge device having a control grid, a source of energy, a series circuit including said condenser, said source of energy and said gaseous, discharge device, a grid-controlled, electron-discharge device, an auxiliary circuit connected to said control grid and having the grid-controlled, electron-discharge device therein, and means for subjecting successive portions of a film to a separate flash of light, said means including means dependent upon said grid-controlled, electron-discharge device for causing a surge of current to flow in said auxiliary circuit to said control grid.

14. Apparatus for taking a series of pictures upon a continuously-moving strip of film with a known interval of time between exposures comprising a camera in which a strip of film is driven at constant speed, an electrical source of intermittent light capable of producing flashes of light shorter than one hundred-thousandth of a second in duration, a commutator operable in synchronism with the film-driving means, means controlled by the commutator for producing electrical impulses at accurately-spaced intervals of time, and an electrical amplifying circuit to control the flashing interval of the source of light from the electrical impulses.

15. Motion-picture apparatus comprising a camera for moving a strip of motion-picture film at a constant velocity, a mercury-arc tube to produce light for exposing pictures upon the film by reflected or transmitted light, an electrical circuit consisting of a source of direct-current power, a condenser in which electrical charge is accumulated in order to be suddenly discharged directly through the mercury lamp, an impedance to connect the condenser to the power supply, an electrical circuit to amplify impulses in order to start the condenser discharge through the mercury lamp at the desired instant, and a commutator or contactor with a set of brushes for closing an electrical circuit to produce a series of impulses at intervals of time corresponding to the time for each frame of the motion-picture film to pass the gate in the camera.

16. Motion-picture apparatus comprising a camera for moving a strip of motion-picture film at a constant speed, a commutator-and-brush arrangement driven by the film-driving mechanism for producing electrical impulses at the instants corresponding to those when the film is in the proper position over the gate, a source of intermittent light having a duration of less than one hundred-thousandth of a second for each flash and a high instantaneous intensity, a second commutator and brush arrangement also connected to the film-driving mechanism but adjusted to produce electrical impulses at intervals of time between those of the first commutator, an electrical circuit for charging the light-producing electrical device at the intervals of time corresponding to the impulses produced by the second commutator, and an electrical circuit for discharging the electrical device and thus producing flashes of light at intervals of time corresponding to impulses produced by the first commutator.

17. A motion-picture camera comprising a luminescent-discharge device, a condenser connected directly across said device and continuously charged from a source of power, and means for exposing successive portions of a film by flashes of light from the luminescent-discharge device, said means including a grid-controlled electric-discharge device for causing a surge of current to flow simultaneously from said source of power through said condenser and said luminescent-discharge device at predetermined intervals.

18. Motion-picture apparatus comprising a lens, means for continuously feeding a film behind the lens, a luminescent-discharge device, a condenser, means for charging the condenser, means comprising an amplifier for causing the condenser to discharge intermittently through the luminescent-discharge device to produce intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

19. Motion-picture apparatus comprising a lens, means for continuously feeding a film behind the lens, a luminescent-discharge device, a condenser, means for charging the condenser from a source of power, means connecting the condenser and the source of power to the luminescent-discharge device, means comprising an auxiliary, trigger circuit for causing a surge of current simultaneously to flow intermittently from the source of power through the condenser and the luminescent-discharge device to produce intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

20. Motion-picture apparatus comprising a lens, means for continuously feeding a film behind the lens, a luminescent-discharge device, a condenser, an impedance, means for connecting the condenser through the impedance to a source of direct current to charge the condenser, means comprising an amplifier for causing the condenser to discharge intermittently through the luminescent-discharge device to produce intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

21. Motion-picture apparatus comprising a lens, means for continuously feeding a film behind the lens, a luminescent-discharge device, a condenser, means for connecting the condenser to a source of power to charge the condenser, means comprising an amplifier for causing the condenser to discharge intermittently through the luminescent-discharge device to produce intermittent flashes of light to which successively to subject successive portions of the film as the said successive portions become framed behind the lens, means for synchronizing the flashes of light with the feeding means to cause the flashes of light to occur successively at moments when the said successive portions of the film are successively framed behind the lens, and means for successively disconnecting the condenser from the source of power during and subsequent to the successive discharges.

22. Motion-picture apparatus comprising a lens, means for continuously feeding a film behind the lens, a luminescent-discharge device, a condenser, a second discharge device, means for connecting the condenser through the second discharge device to a source of direct current to charge the condenser, means for causing the condenser to discharge intermittently through the luminescent-discharge device to produce intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

23. Motion-picture apparatus comprising a lens, means for continuously feeding a film behind the lens, a luminescent-discharge device, a condenser, a second discharge device having a control grid, means for connecting the condenser through the second discharge device to a source of power to charge the condenser, and means comprising the control grid for successively disconnecting the condenser from the source of power during and subsequent to the successive discharges.

24. Motion-picture apparatus comprising a lens, means for continuously feeding a film behind the lens, a luminescent-discharge device, a condenser, a second discharge device having a control grid, a charged condenser, means for connecting the first-named condenser through the second discharge device to the charged condenser to charge the first-named condenser, means for causing the condenser to discharge intermittently through the luminescent-discharge device to produce intermittent flashes of light to which successively to subject successive portions of the film as the said successive portions become framed behind the lens, means for synchronizing the flashes of light with the feeding means to cause the flashes of light to occur successively at moments when the said successive portions of the film are successively framed behind the lens, and means comprising the control grid for successively disconnecting the condenser from the source of power during and subsequent to the successive discharges.

25. Motion-picture apparatus comprising a camera provided with a lens, means for continuously feeding a film behind the lens at relatively high speed, a luminescent-discharge device, a condenser, means for charging the condenser, means comprising an amplifier for causing the condenser to discharge intermittently through the luminescent-discharge device during times less than ten microseconds in duration to produce intermittent flashes of light having an instantaneous intensity sufficiently high to expose by reflected light during the said times successive portions of the film through the lens as the said successive portions become framed behind the lens, and means for synchronizing the flashes of light with the feeding means to cause the flashes of light to occur successively at moments when the said successive portions of the film are successively framed behind the lens.

26. Motion-picture apparatus comprising a camera provided with a lens, means for continuously feeding a film behind the lens at relatively high speed, a luminescent-discharge device, a condenser, means for charging the condenser, means comprising an amplifier for causing the condenser to discharge intermittently through the luminescent-discharge device to produce intermittent flashes of light having an instantaneous intensity sufficiently high to expose by reflected light without blur successive portions of the film through the lens as the said successive portions become framed behind the lens, and means for synchronizing the flashes of light with the feeding means to cause the flashes of light to occur successively at moments when the said successive portions of the film are successively framed behind the lens.

27. Apparatus of the character described comprising a camera, means for driving a film through the camera, means for illuminating an object outside of the camera, and means whereby light rays are caused to travel from the illuminated object into the camera and to the film, the illuminating means comprising a gaseous-discharge lamp, means for causing the lamp to flash periodically, and means for synchronizing the flashes with the travel of the film in the camera, the synchronizing means comprising a grid-controlled gaseous-discharge device for controlling the gaseous-discharge lamp and a contactor operating in synchronism with the film-driving means for controlling the grid of the grid-controlled gaseous-discharge device.

28. Apparatus of the character described comprising a camera, means for driving a film through the camera, means for illuminating an object outside of the camera, and means whereby light rays are caused to travel from the illuminated object into the camera and to the film, the illuminating means comprising a gaseous-discharge lamp, means for causing the lamp to flash periodically, and means for synchronizing the flashes with the travel of the film in the camera, the synchronizing means comprising a vacuum tube for controlling the gaseous-discharge lamp.

29. Motion-picture apparatus comprising a lens, means for continuously feeding a film behind the lens, a luminescent-discharge device, means comprising a grid-controlled, gaseous-discharge device for producing in the luminescent-discharge device intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

30. Motion-picture apparatus comprising a lens, means for continuously feeding a film behind the lens, a luminescent-discharge device, means comprising an amplifier for producing in the luminescent-discharge device intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

31. Motion-picture apparatus comprising a lens, means for continuously feeding a film behind the lens, a luminescent-discharge device, means comprising an oscillator for producing in the luminescent-discharge device intermittent flashes of light to which successively to subject successive portions of the film as the successive portions become framed behind the lens, and means for synchronizing the flashes of light with the feeding means to cause the flashes of light to occur successively at moments when the said successive portions of the film are successively framed behind the lens.

32. Motion-picture apparatus comprising a lens, means for continuously feeding a film behind the lens, a luminescent-discharge device, means comprising a rectifier for producing in the luminescent-discharge device intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

33. Motion-picture apparatus comprising a lens, means for continuously feeding a film behind the lens, a luminescent-discharge device, means comprising an auxiliary trigger circuit for producing in the luminescent-discharge device intermittent flashes of light to which successively to subject successive portions of the film as the said successive portions become framed behind the lens, means for synchronizing the flashes of light with the feeding means to cause the flashes of light to occur successively at moments when the said successive portions of the film are successively framed behind the lens, and a discharge device in the auxiliary circuit for controlling the auxiliary circuit.

34. Motion-picture apparatus comprising a lens, means for continuously feeding a film behind the lens, a luminescent-discharge device, a vacuum tube having a control circuit and an output circuit, means connected with the control circuit and operating through the output circuit for rendering the vacuum tube intermittently effective to produce in the luminescent-discharge device intermittent flashes of light to which successively to subject successive portions of the film as the said successive portions are framed behind the lens, and means for synchronizing the flashes of light with the feeding means to cause the flashes of light to occur successively at moments when the said successive portions of the film are successively framed behind the lens.

35. Motion-picture apparatus comprising a lens, means for continuously feeding a film behind the lens, a luminescent-discharge device having a cathode, means for intermittently causing a source of electrons to exist at the cathode to produce in the luminescent-discharge device intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

36. Motion-picture apparatus comprising a lens, means for continuously feeding a film behind the lens, a luminescent-discharge device having a starting electrode, means comprising a discharge device for intermittently controlling the starting electrode to produce in the luminescent-discharge device intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

37. Motion-picture apparatus comprising a lens, means for continuously feeding a film behind the lens, a luminescent-discharge device having a starting electrode, a transformer having a primary winding and a secondary winding connected to the starting electrode, means for intermittently supplying energy to the primary winding, thereby controlling the starting electrode to produce in the luminescent-discharge device intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

38. Motion-picture apparatus comprising a lens, means for continuously feeding a film behind the lens, a luminescent-discharge device, means comprising a transformer for intermittently subjecting the luminescent-discharge device to a relatively high potential to produce in the luminescent-discharge device intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens, the synchronizing means comprising a grid-controlled, gaseous-discharge device for controlling the transformer.

39. Motion-picture apparatus comprising a camera provided with a lens, means for continuously feeding a film through the camera behind the lens, means for illuminating an object outside the camera, and means whereby light rays are caused to travel from the illuminated object through the lens into the camera and to the film, the illuminating means comprising a gaseous-discharge device, means comprising a transformer for intermittently subjecting the device to a relatively high potential to produce in the device intermittent flashes of light to which successively to subject successive portions of the film as the said successive portions become framed behind the lens, and means for synchronizing the flashes of light with the feeding means to cause the flashes of light to occur successively at moments when the said successive portions of the film are successively framed behind the lens.

HAROLD E. EDGERTON.